United States Patent
Saitou et al.

(10) Patent No.: US 9,372,376 B2
(45) Date of Patent: *Jun. 21, 2016

(54) LIQUID CRYSTAL DISPLAY DEVICE AND MANUFACTURING METHOD THEREOF

(71) Applicants: Japan Display Inc., Tokyo (JP); Panasonic Liquid Crystal Display Co., Ltd., Himeji-shi (JP)

(72) Inventors: Terunori Saitou, Mobara (JP); Hidekazu Miyake, Mobara (JP); Takuo Kaitoh, Mobara (JP); Yoshiharu Owaku, Mobara (JP)

(73) Assignees: Japan Display Inc., Tokyo (JP); Panasonic Liquid Crystal Display Co. LTD, Himeji-shi (JP)

( * ) Notice: Subject to any disclaimer, the term of this patent is extended or adjusted under 35 U.S.C. 154(b) by 34 days.

This patent is subject to a terminal disclaimer.

(21) Appl. No.: 14/105,496

(22) Filed: Dec. 13, 2013

(65) Prior Publication Data

US 2014/0106640 A1    Apr. 17, 2014

Related U.S. Application Data

(62) Division of application No. 13/042,490, filed on Mar. 8, 2011, now Pat. No. 8,610,868.

(30) Foreign Application Priority Data

Mar. 9, 2010    (JP) .................................. 2010-051862

(51) Int. Cl.
    *G02F 1/1345* (2006.01)
    *G02F 1/1362* (2006.01)
    *G02F 1/1333* (2006.01)

(52) U.S. Cl.
    CPC .......... *G02F 1/13458* (2013.01); *G02F 1/1333* (2013.01); *G02F 1/136204* (2013.01); *G02F 2001/133388* (2013.01); *G02F 2202/103* (2013.01); *G02F 2202/22* (2013.01)

(58) Field of Classification Search
    CPC .. G02F 1/1368; G02F 1/1333; G02F 1/13458
    USPC ........................................ 349/42–43, 149–152
    See application file for complete search history.

(56) References Cited

U.S. PATENT DOCUMENTS 6,710,839 B2    3/2004    Komeno et al.
8,582,068 B2 *  11/2013   Kawamura ............ G02F 1/1345
                                                  349/149

(Continued)

FOREIGN PATENT DOCUMENTS

| JP | 06-258665   | 9/1994 |
| JP | 2001-21909  | 1/2001 |
| JP | 2008-203761 | 9/2008 |

*Primary Examiner* — Dung Nguyen
(74) *Attorney, Agent, or Firm* — Typha IP LLC

(57) ABSTRACT

A method of manufacturing a liquid crystal display device having a substrate with a display area, a control area adjacent to the display area, and terminals. The method includes forming an interlayer insulating film and an a-Si film below an image signal line in the display area and below a line in the same layer as the image signal line in the control area, forming a scribing line outside the terminals, forming a ground line in the same layer as the scan line outside the scribing line, forming the interlayer insulating film outside the terminal, without forming the a-Si film on the interlayer insulating film, forming a static electricity protection line coupled to the terminal on the interlayer insulating film, the static electricity protection line being coupled to other static electricity protection lines outside the ground line, and, after the steps above, separating the substrate along the scribing line.

14 Claims, 4 Drawing Sheets

(56) References Cited

U.S. PATENT DOCUMENTS

| | | | |
|---|---|---|---|
| 8,610,868 B2 * | 12/2013 | Saitou et al. | 349/149 |
| 2008/0123005 A1 | 5/2008 | Sohn et al. | |
| 2008/0204619 A1 | 8/2008 | Saitou et al. | |

\* cited by examiner

LIQUID CRYSTAL DISPLAY DEVICE AND MANUFACTURING METHOD THEREOF

CROSS-REFERENCE TO RELATED APPLICATIONS

This application is a divisional application of U.S. Ser. No. 13/042,490, filed Mar. 8, 2011, and which application claims priority from Japanese Patent Application JP 2010-051862 filed on Mar. 9, 2010, the contents of which are hereby incorporated by reference into this application.

FIELD OF THE INVENTION

The present invention relates to a display device, and more particularly to a display device configured to prevent a reduction in the yield due to dielectric breakdown by static electricity generated in the manufacturing process.

BACKGROUND OF THE INVENTION

In a liquid crystal display device, a TFT substrate and a counter substrate are disposed opposite to each other with a liquid crystal interposed between the two substrates. The TFT substrate is a substrate in which pixels are arranged in a matrix form. Each of the pixels includes a pixel electrode, a thin film transistor (TFT), and the like. The counter substrate is a substrate in which color filters and the like are formed at locations corresponding to the pixel electrodes of the TFT substrate. With this configuration, the liquid crystal display device forms an image by controlling the transmittance of light of the liquid crystal molecules for each pixel.

There are various photolithography processes, in particular, in the formation of the TFT substrate of the liquid crystal display device. However, static electricity can easily be generated in the photolithography processes such as film formation and drying using a spinner. In the TFT substrate, a large number of scan lines and image signal lines intersect each other through an interlayer insulation film. Further, a large number of TFTs are formed to control these lines. When static electricity is generated in the manufacturing process, the interlayer insulation film is destroyed. As a result, a short circuit occurs between the scan line and the image signal line, or the TFT is destroyed. For this reason, the static electricity generated in the manufacturing process has a significant influence on the manufacturing yield.

In order to prevent the dielectric breakdown and TFT destruction caused by static electricity, measures are taken that prevent static electricity from entering a display area in which pixels and the like are formed, for example, by allowing the static electricity to flow to earth before entering the display area. JP-A No. 203761/2008 describes a configuration that protects a scan line drive circuit and the like provided in the vicinity of the display area, from external static electricity. In this configuration, a conductive film is coated on the surface of the scan line drive circuit and the like, and is grounded through an insulating film. Further, JP-A No. 21909/2001 describes an example of a diode circuit for protection against static electricity produced in the vicinity of the display area.

TFT using a-Si film is used in relatively large displays such as TV screens. On the other hand, TFT using poly-Si is used in relatively small displays such as mobile phones and portable game consoles. In the case of a liquid crystal display device using poly-Si TFT, the mobility of poly-Si is high, so that a drive circuit is formed by the TFT. Then, a scan line GL drive circuit and the like are mounted in a substrate.

The large liquid crystal display device using the a-Si TFT and the small liquid crystal display device using the poly-Si TFT are different in the configuration for protection against static electricity due to the difference in the space of the substrate. The large liquid crystal display device using the a-Si TFT has a relatively large space. Thus, a diode circuit is formed outside a display area 500 in which pixels are arranged in a matrix form, to protect the display area 500 from static electricity. FIG. 7 shows the circuit configuration.

In FIG. 7, a static electricity protection circuit is formed between the display area 500 and a terminal 200 coupled to a scan line GL. In FIG. 7, the static electricity protection circuit is formed using diode. The diode is formed by coupling a gate and a drain or source of a TFT. In FIG. 7, when large positive static electricity enters from the terminal 200, a diode 130 is turned on. When large negative static electricity enters, a diode 140 is turned on. This allows the static electricity to flow to earth, preventing destruction of the TFT in the display area 500, or preventing dielectric breakdown of an interlayer insulating film 300.

The small liquid crystal display device using the poly-Si TFT has a small substrate. In addition, a portion of the drive circuit formed by the TFT is mounted in the substrate. Thus, it is difficult to provide the static electricity protection circuit within the substrate. Such a small liquid crystal display device is manufactured by the following steps. First, a large number of substrates are formed on a mother panel. Then, the substrates are separated from the mother panel by scribing or other means. In this way, individual liquid crystal display devices are formed.

Thus, in the small liquid crystal display device using the poly-Si TFT, a small space is formed between the individual substrates, in which a static electricity protection circuit and the like are formed. At the time of scribing, the small space is removed and discarded. Because large static electricity is generated in the manufacturing process, the static electricity protection circuit is not used after completion of the product.

FIG. 8 shows the configuration of the static electricity protection circuit in the small liquid crystal display device described above. In FIG. 8, the substrate is located above a scribing line 210. Although the substrate includes the terminals 200 and the display area 500 or other components, only one terminal is shown in FIG. 8.

In FIG. 8, a static electricity protection line 230 extends beyond the scribing line 210 to the outside of the substrate. The static electricity protection line 230 is coupled to a diode 150 as well as a diode 160. Each of the diodes 150 and 160 is formed by coupling a gate and a drain or source of the TFT. Here, it is assumed that large static electricity is induced in the vicinity of the terminal 200. The diodes 150 and 160 are turned on to allow the static electricity to flow to earth. Thus, the TFT of the display area 500 or the interlayer insulating film and the like in the substrate is protected from the static electricity.

However, the higher the resolution demanded in the display the more the number of pixels. As a result, the number of scan lines GL, the number of signal lines DL and the like increase. For example, if the number of scan lines GL increases, it is difficult to form the static electricity protection circuit for each scan line GL in the limited space.

Meanwhile a selector driving method has been developed to address the increase in the number of scan lines GL due to the increased resolution. The selector driving method is a method for dividing the scan lines GL into a plurality of blocks, and scanning the scan lines GL for each block to reduce the number of leader lines of the scan lines GL. However, in the case of the selector driving method, the number of control TFTs increases to control the scan lines GL for each block. As a result, it is necessary to have a space for the control TFTs. Thus, the problem of lack of space for the static electricity protection circuit still remains.

SUMMARY OF THE INVENTION

The present invention provides a configuration that can prevent the TFT or the interlayer insulating film 300 from being destroyed by static electricity, even if the number of pixels increases due to the increased resolution.

The present invention overcomes the above problem by means described in detail below.

(1) There is provided a liquid crystal display device including a substrate. The substrate includes a display area, a control area adjacent to the display area, and terminals. In the display area, scan lines extend in a first direction and are arranged in a second direction. Further, image signal lines extend in the second direction and are arranged in the first direction. In addition, pixels are formed in each area surrounded by the scan lines and the image signal lines. In the control area, scan leaders coupled to the scan lines extend in the first direction and are arranged in the second direction. Further, control lines extend in the second direction and are arranged in the first direction. Then, the terminals are coupled to the control lines. An interlayer insulating film and an a-Si film are formed below the image signal line in the display area and below a line formed in the same layer as the image signal line in the control area. A line is formed in the same layer as the image signal line outside the terminal. The line is electrically coupled to the terminal. The interlayer insulating film is formed below the line outside the terminal. However, the a-Si film is not formed below the line outside the terminal.

(2) In the liquid crystal display device described in (1), a width of the a-Si film is greater than a width of the image signal line, or greater than a width of the line formed in the same layer as the image signal line in the control area.

(3) There is provided a method of manufacturing a liquid crystal display device. The liquid crystal display device includes a substrate having a display area, a control area adjacent to the display area, and terminals. In the display area, scan lines extend in a first direction and are arranged in a second direction. Further, image signal lines extend in the second direction and are arranged in the first direction. In addition, pixels are formed in each area surrounded by the scan lines and the image signal lines. In the control area, scan leaders coupled to the scan lines extend in the first direction and are arranged in the second direction. Further, control lines extend in the second direction and are arranged in the first direction. Then, the terminals are coupled to the control lines. The manufacturing method of the liquid crystal display device includes the steps of: forming an interlayer insulating film and an a-Si film below the image signal line in the display area and below a line formed in the same layer as the image signal line in the control area; forming a scribing line outside the terminal to separate the substrate; forming an earth line in the same layer as the scan line outside the scribing line; forming the interlayer insulating film outside the terminal, without forming the a-Si film on the interlayer insulating film; forming a static electricity protection line electrically coupled to the terminal on the interlayer insulating film; forming the static electricity protection line so as to be coupled to other static electricity protection lines outside the earth line; and after the above steps, separating the substrate along the scribing line.

(4) In the manufacturing method of the liquid crystal display device described in (3), a width of the a-Si film below the image signal line in the display area is greater than a width of the image signal line. The width of the a-Si film below a line formed in the same layer as the image signal line in the control area is greater than a width of the line formed in the same layer of the image signal line.

(5) There is provided a liquid crystal display device includes a substrate. The substrate includes a display area, and terminals for supplying signals to the display area. In the display area, scan lines extend in a first direction and are arranged in a second direction. Further, image signal lines extending in the second direction and are arranged in the first direction. In addition, pixels are formed in each area surrounded by the scan lines and the image signal lines. Then, an interlayer insulating film and an a-Si film are formed between the image signal line and the scan line in the display area. A line is formed in the same layer as the image signal line outside the terminal. The line is electrically coupled to the terminal. The interlayer insulating film is formed below the line outside the terminal. However, the a-Si film is not formed below the line outside the terminal.

(6) There is provided a method of manufacturing a liquid crystal display device. The liquid crystal display device includes a substrate having a display area, and terminals for supplying signals to the display area. In the display area, scan lines extend in a first direction and are arranged in a second direction. Further, image signal lines extend in the second direction and are arranged in the first direction. In addition, pixels are formed in each area surrounded by the scan lines and the image signal lines. The manufacturing method of the liquid crystal display device includes the steps of: forming an interlayer insulating film and an a-Si film below the image signal line in the display area; forming a scribing line outside the terminal to separate the substrate; forming an earth line in the same layer as the scan line outside the scribing line; forming the interlayer insulating film outside the terminal, without forming the a-Si film on the interlayer insulating film; forming a static electricity protection line electrically coupled to the terminal on the interlayer insulating film; forming the static electricity protection line so as to be coupled to other static electricity protection lines outside the earth line; and after the above steps, separating the substrate along the scribing line.

According to the present invention, it is possible to form a static electricity protection circuit without using a diode circuit. Thus, the space for the static electricity protection circuit can be significantly reduced. Further, according to the present invention, the static electricity protection circuit can be achieved in practice without using any circuit element, resulting in a significant reduction in the manufacturing costs.

Furthermore, according to the present invention, it is possible to significantly reduce the space for the static electricity protection circuit. Thus, a high-resolution and highly reliable display with a large number of pixels can be manufactured at low cost.

DETAILED DESCRIPTION OF THE PREFERRED EMBODIMENTS

Hereinafter, the present invention will be described in detail with reference to preferred embodiments.

First Embodiment

Figure 1:
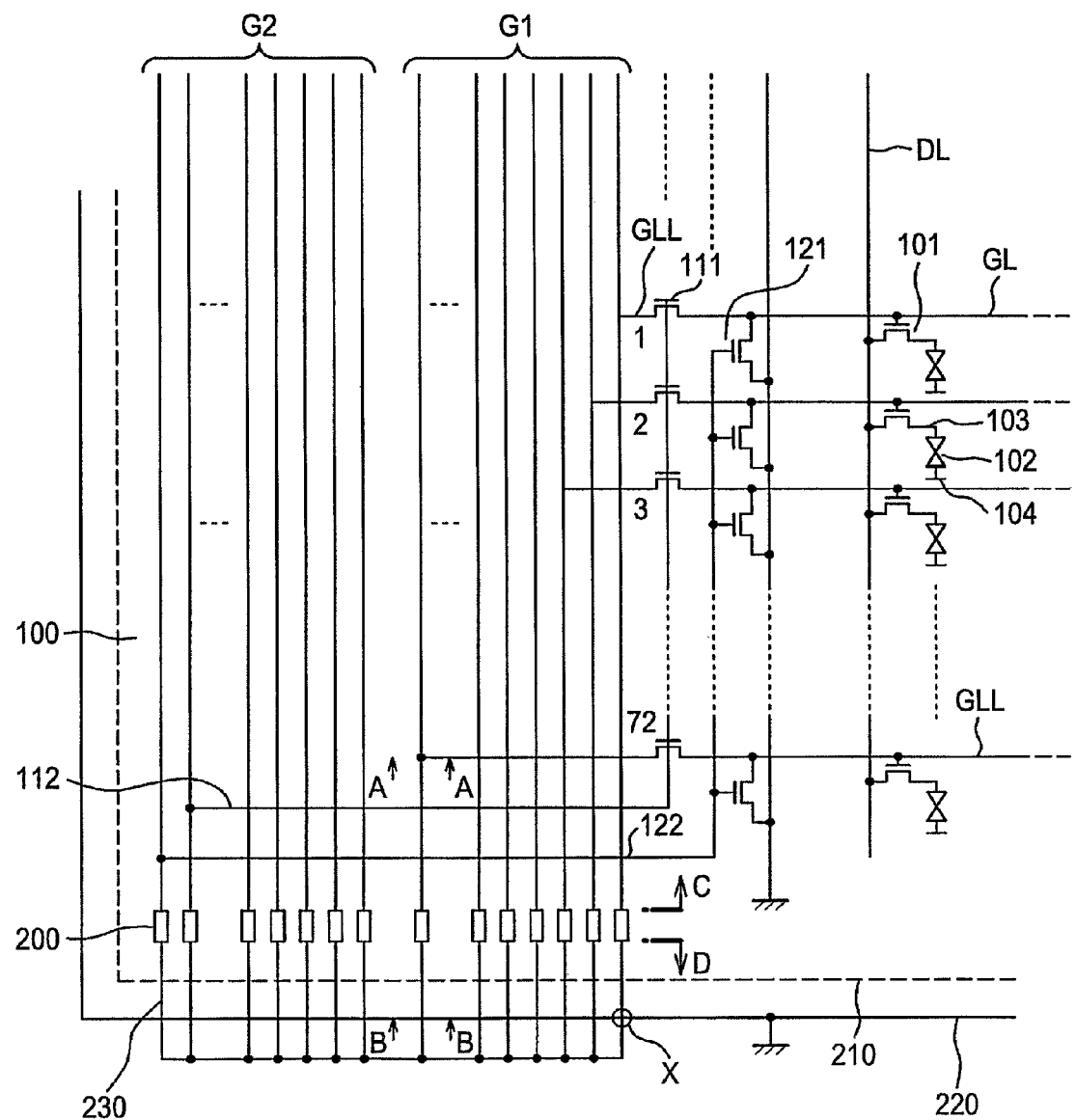
FIG. 1 is a schematic plan view of a liquid crystal display device according to the present invention.

FIG. 1 is a circuit diagram of a static electricity protection circuit according to the present invention. FIG. 1 shows only a portion of a liquid crystal display device. The liquid crystal display device shown in FIG. 1 uses a selector driving method. The selector driving method can reduce the number of lines for coupling between a scan line GL and a scan line GL drive circuit, compared to the conventional driving method. However, although it is possible to reduce the number of scan lines GL or the number of lines for controlling the scan lines GL, the number of TFTs for controlling the scan lines GL increases. Hence protection against static electricity is still an important issue.

Figure 6:
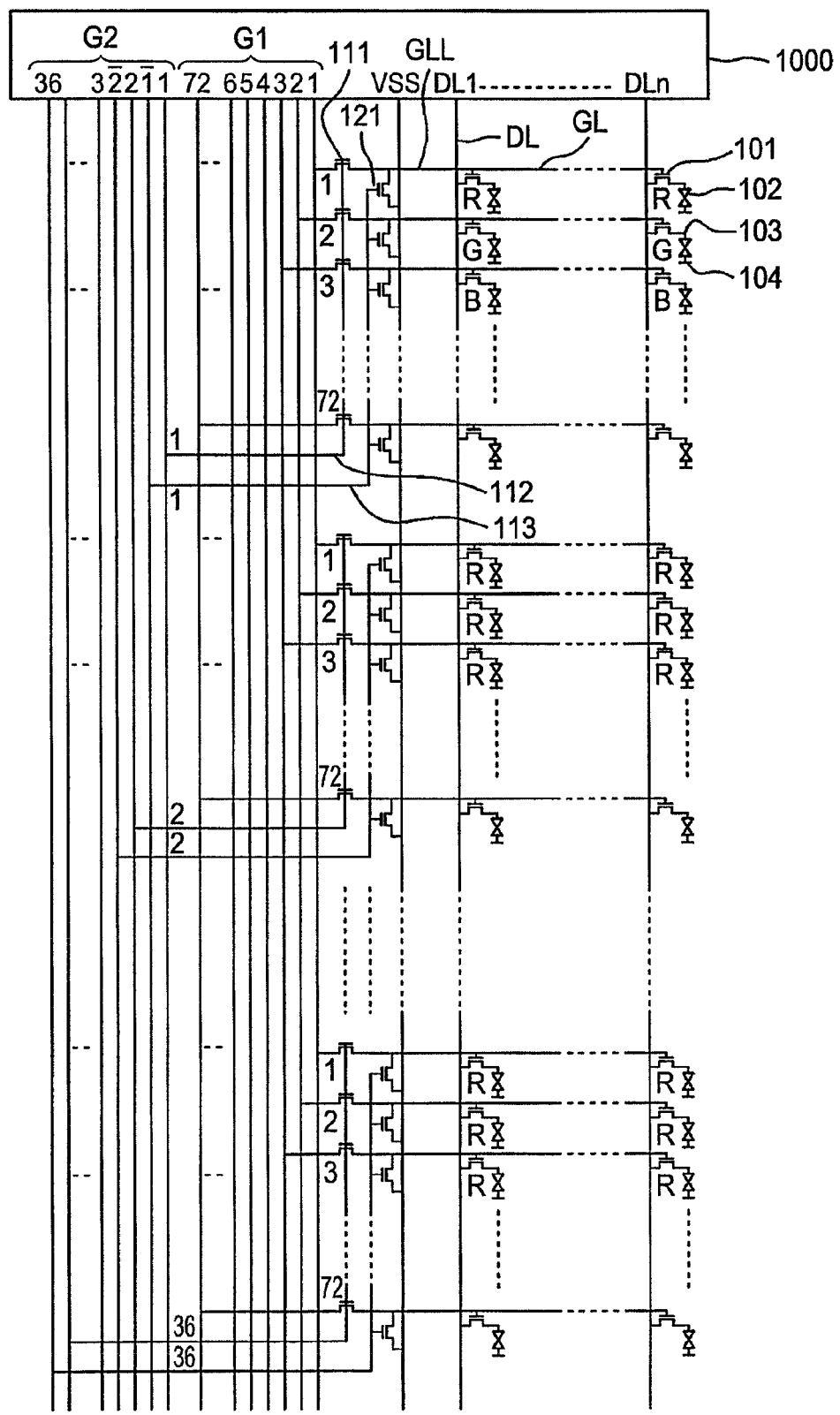
FIG. 6 is a circuit diagram of the liquid crystal display device using a selector driving method.
Figure 7:
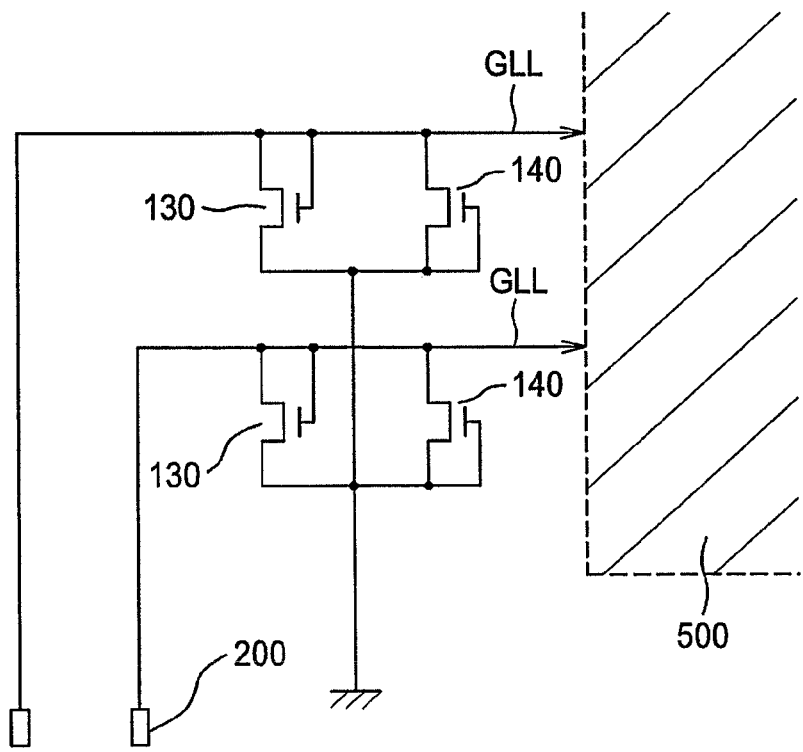
FIG. 7 is an example of a protection circuit using diode.
Figure 8:
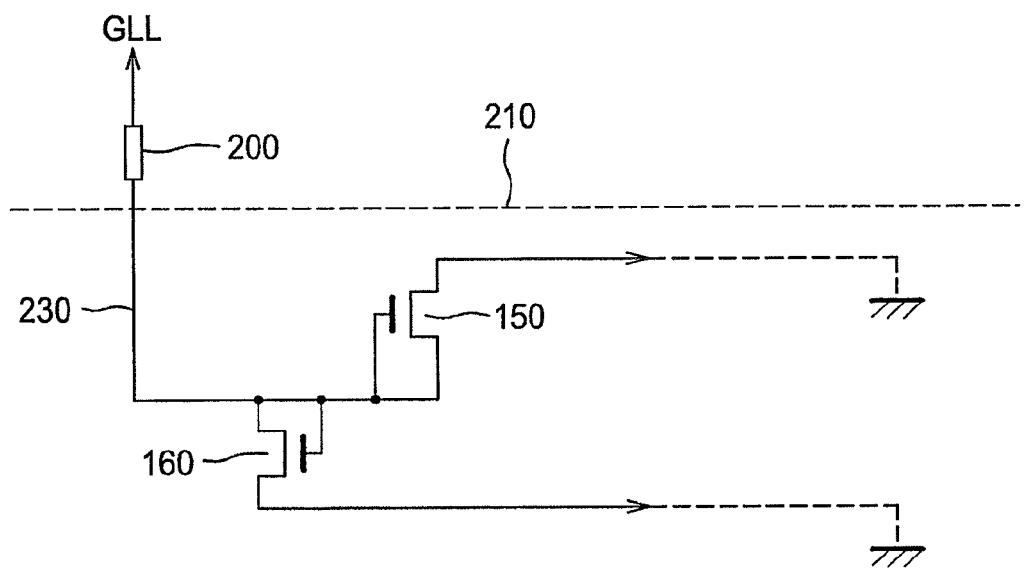
FIG. 8 is another example of the protection circuit using diode.

Before describing the circuitry shown in FIG. 1, the selector driving method will be described with reference to FIG. 6. In FIG. 6, a drive circuit 1000 for scan lines GL and image signal lines DL is located on the upper side of the figure. Then, a control area for driving the scan lines GL is located on the left side. In FIG. 6, the right side is a display area 500, in which pixels each including a pixel electrode 103, a pixel TFT 101, and the like, are arranged in a matrix form. In the display area 500 in FIG. 6, the scan lines GL extend in the horizontal direction and are arranged in the vertical direction. Further, the image signal lines DL extend in the vertical direction and are arranged in the horizontal direction. In addition, the pixels are formed in each area surrounded by the scan lines GL and the image signal lines DL.

The pixel TFT 101 is formed in each pixel. The drain of the pixel TFT 101 is coupled to the image signal line DL. The gate of the pixel TFT 101 is coupled to the scan line GL. The source of the pixel TFT 101 is coupled to the pixel electrode 103. A liquid crystal layer 102 is present between the pixel electrode 103 and a common electrode 104. A constant voltage is applied to the common electrode 104, and a voltage corresponding to an image signal from the image signal line DL is applied to the pixel electrode 103. In this way, the orientation state of the liquid crystal layer 102 is changed to control the transmittance of light of the liquid crystal layer 102 for each pixel. Thus, an image is formed.

The left side of FIG. 6 is the control circuit of the scan signal lines. In the conventional driving method, the same number of control lines of the scan lines GL as the number of scan lines GL should be provided on the lower side of FIG. 6. Thus, it is necessary to have a large space to provide the control lines of the scan lines GL. On the other hand, in the selector driving method shown in FIG. 6, the scan lines GL are divided into blocks to scan the scan lines GL for each block. Thus, the number of control lines of the scan lines GL is significantly reduced.

In FIG. 6, 72 scan lines GL constitute one block. In this specification, the scan line GL in the display area 500 is referred to as scan line GL, and the portion extending from the display area 500 to the outside in the horizontal direction is referred to as scan leader GLL. The scan leader is coupled to the scan line GL in the display area 500. Then, a first control TFT 111 and a second control TFT 121 are coupled to the scan leader GLL. On the left side of FIG. 6, 72 first control lines G1 extend in the vertical direction. Similarly, 72 second control lines G2 extend in the vertical direction. In addition, 36 first gate lines 112 and 36 second gate lines 122, which are coupled to the second control lines G2, extend in the horizontal direction, respectively. Each scan line block containing 72 scan lines GL is selected by the first and second gate lines 112, 122.

As shown in FIG. 6, the 72 first control TFTs 111 are controlled at the same time by the first gate line 112. Also, 72 second control TFTs 121 are controlled at the same time by the second gate line 122. When the first control TFTs 111 are turned on, the second control TFTs 121 are turned off. On the other hand, when the first control TFTs 111 are turned off, the second control TFTs 121 are turned on.

Here, for example, the top 72 scan lines GL are supposed to be a first block. When the first control TFTs 111 in the first block are turned on, the first control TFTs 111 in the second and subsequent blocks are turned off. Then, the scan lines GL in the second and subsequent blocks are in the off state during the scan of the scan lines GL in the first block.

When the scan of the first block is completed, all the first control TFTs 111 in the first block are turned off. Then, the first control TFTs 111 in the second block are turned on. Then, the scan lines GL in the second block are scanned. At this time, the scan lines GL in the first block and in the third and subsequent blocks are all in the off state.

It is to be noted that, for example, when the first control TFTs 111 in the first block are turned on and when the scan lines GL in the first block are scanned, the second control TFTs 121 are turned off. Thus, the scan signal is transmitted to the scan lines GL of the display area 500. When the scan of the first block is completed and when the writing to the pixels existing in the first block is completed, the second control TFTs 121 are turned on. Then, the scan lines GL are changed to VSS level.

As described above, also in the selector driving method, the scan of the scan lines GL is performed in the same manner as in the normal driving method. In the normal driving, the necessary number of control lines for controlling the scan lines GL is, for example, 72×36=2592 lines. However, in the selector driving method, the necessary number of control lines is only 72×2=144 lines. For this reason, the number of control lines of the scan lines GL can be significantly reduced in the selector driving method compared to the conventional method.

However, the selector driving method requires a large number of first control TFTs 111 and second control TFTs 121 in order to control the control lines of the scan lines GL. For example, in FIG. 6, the necessary number of first control TFTs 111 is 72×36=2592, and the necessary number of second control TFTs 121 is 72×36=2592. The space occupied by the first control TFTs 111 and by the second control TFTs 121 is much smaller than the space for providing the control lines of the scan lines GL. However, the size of the substrate 100 is limited, so that the problem of space arises when the number of pixels increases.

The present invention prevents the TFT or the interlayer insulating film 300 from being destroyed by static electricity, only by the configuration of the static electricity protection lines 230 as shown in FIG. 1, without using the diode circuit as a circuit for protecting against static electricity. FIG. 1 is an enlarged view of the scan lines GL in the bottommost 36th block in FIG. 6, together with the terminals 200, the scribing line 210, the earth line 220, and the static electricity protection lines 230. In other words, FIG. 1 is an enlarged view of the lower left portion of the liquid crystal display device. It is to be noted that the particular potential VSS in FIG. 6 corresponds to the earth potential in FIG. 1.

In FIG. 1, the right side shows the display area 500 in which pixels are arranged in a matrix form. Each pixel includes the pixel TFT 101, the pixel electrode 103, the liquid crystal layer 102, the common electrode 104, and the like. The scan leaders GLL extend from the scan lines GL of the display area 500 to the left side. Both of the first control TFT 111 and the second control TFT 121 are coupled to the scan leader GLL.

The 72 first control TFTs 111 are controlled by the second control line G2 that transmits the 36th positive signal. The 72 second control TFTs 121 are controlled by the second control line G2 that transmits the 36th negative signal. When the first control TFTs 111 are turned on, the second control TFTs 121 are turned off. On the other hand, when the first control TFTs 111 are turned off, the second control TFTs 121 are turned on. The selector driving method is the same as described with reference to FIG. 6.

In FIG. 1, the 72 first control lines G1 extend in the vertical direction. Similarly, the 72 second control lines G2 extend in the vertical direction. The first control TFTs 111 and the second control TFTs 121 are coupled to the terminals 200 formed in an end portion of the substrate 100. The dotted line drawn on the outside of the terminals 200 represents the scribing line 210. In other words, after completion of the substrate 100, the substrate 100 is separated from the mother panel along the scribing line 210.

In FIG. 1, the earth line 220 is formed outside the scribing line 210 to surround the scribing line 210. FIG. 1 only shows the lower left portion of the liquid crystal display device. However, actually, the earth line 220 surrounds the entire circumference of the scribing line 210. The earth line 220 is formed in the same layer as the scan line GL in the display area 500.

Each of the static electricity protection lines 230 extends from each terminal 200 beyond the scribing line 210 to the outside of the earth line 220. Then, each of the static electricity protection lines 230 is coupled together outside the earth line 220. FIG. 1 shows a state in which the static electricity protection lines 230 are coupled to each other outside the earth line 220. This is the state of the manufacturing process. After completion of the substrate 100, the portion outside the substrate 100 is removed along the scribing line 210. In this way, the terminals 200 are insulated from each other after completion of the substrate 100.

The static electricity protection line 230 is formed in the same layer as the image signal line DL in the display area 500. Thus, the interlayer insulating film 300 is formed between the earth line 220 and the static electricity protection line 230. In general, the interlayer insulating film 300 is formed using SiN. For example, the lower line formed in the same layer as the scan line GL, namely, the earth line 220, is formed using MoW. Further, for example, the upper line formed in the same layer as the image signal line DL, namely, the static electricity protection line 230, is formed by Al alloy.

In the area inside the terminals 200 in FIG. 1, namely, in the area indicated by C in FIG. 1, the first and second control lines G1, G2, intersect the scan leaders GLL as well as the first and second gate lines 112, 122, through the interlayer insulating film 300 and the a-Si film 400. In the display area 500, the scan lines GL and the image signal lines DL intersect each other also through the interlayer insulating film 300 and the a-Si film 400.

As described above, in the area inside the terminals 200, not only the interlayer insulating film 300 but also the a-Si film 400 is provided between the upper and lower lines, to prevent short circuit in the intersections between the upper and lower lines. In other words, the a-Si film 400 undoped with impurities has a high electrical resistivity, and is the same as the insulation material. Thus, the a-Si film 400 has the same effect as the interlayer insulating film 300. In other words, in the intersection between the upper and lower lines, there is the same effect as forming two layers of the interlayer insulation film 300.

Figure 2:
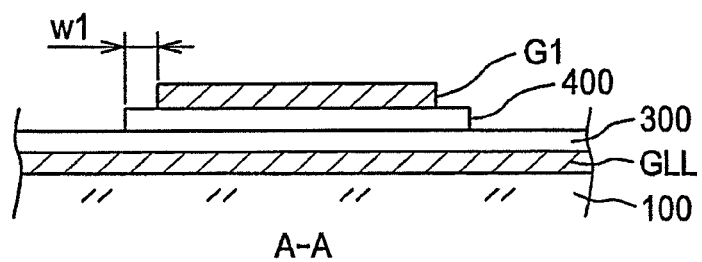
FIG. 2 is a cross-sectional view in a scan line control area according to a first embodiment.

FIG. 2 is a view of the state described above. FIG. 2 shows, for example, an A-A cross-sectional view of FIG. 1. In FIG. 2, the scan leader GLL, which is the lower line, extends in the horizontal direction on the substrate 100. The interlayer insulating film 300 is formed on the scan leader GLL. The a-Si film 400 is formed on the interlayer insulating film 300. Then, the first control line G1, which is the upper line, extends on the a-Si film 400 vertically on the paper. It is to be noted that the intersection between the scan line GL and the image signal line DL in the display area 500 has the same configuration as shown in FIG. 2.

The a-Si film 400 is slightly smaller than the first control line G1, extending below the first control line G1 in the same direction as the first control line G1. As shown in FIG. 2, the width of the a-Si film 400 is greater by about w1=1 μm on one side, than the width of the first control line G1. Here, the thickness of the interlayer insulating film 300 is, for example, about 200 nm. The thickness of the a-Si film 400 is, for example, about 50 nm. The withstanding voltage between the upper line G1 and the lower line GLL is increased by the presence of the a-Si film 400 in the area inside the terminals 200, taking into account the case in which a certain amount of static electricity enters the area.

While in the area outside the terminal 200, namely, in the area indicated by D in FIG. 1, the earth line 220, which is the lower line, intersect each static electricity protection line 230, which is the upper line. The interlayer insulating film 300 is formed between the earth line 220 and the static electricity protection line 230. However, unlike the area C, the a-Si film 400 is not formed on the interlayer insulating film 300 in the intersecting portion.

Figure 3:
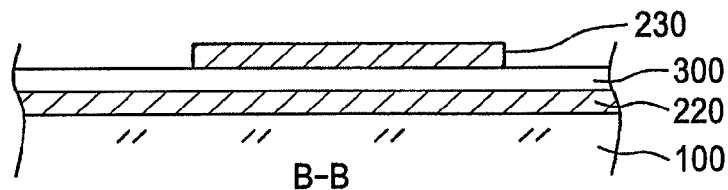
FIG. 3 is a cross-sectional view of the intersection between a static electricity protection line and an earth line according to the first embodiment.

FIG. 3 is a view of the state described above. In FIG. 3, the earth line 220, which is the lower line, extends in the horizontal direction on the substrate 100. The interlayer insulating film 300 is present on the earth line 220. Then, the static electricity protection line 230 extends on the interlayer insulating film 300 vertically on the paper. Only the interlayer insulating film 300, but not the a-Si film 400, is present between the earth line 220 and the static electricity protection line 230.

When FIG. 2 and FIG. 3 are compared, the interlayer insulating film 300 does not exist between the lower and upper lines in FIG. 3. Thus, when static electricity enters, dielectric breakdown is more likely to occur in the configuration of FIG. 3 than in the configuration of FIG. 2. In other words, when static electricity enters, dielectric breakdown occurs in the intersection X between the earth line 220 and the static electricity protection line 230 in FIG. 1. This allows the static electricity to escape to the earth line 220. As a result, the control area formed in the area C in FIG. 1, as well as the interlayer insulating film and the TFT in the display area 500, can be protected from the static electricity.

As shown in FIG. 1, the feature of the present invention is to provide protection against such static electricity only by the three-dimensional wiring structure without using the diode circuit. As the present invention does not use the diode circuit, it is possible to significantly reduce the space for the protection circuit against static electricity. In addition, as the present invention does not use the diode circuit or the like and has a simple configuration, it is possible to form the protection circuit at a low cost and to prevent the manufacturing yield from lowering due to the protection circuit.

Second Embodiment

Figure 4:
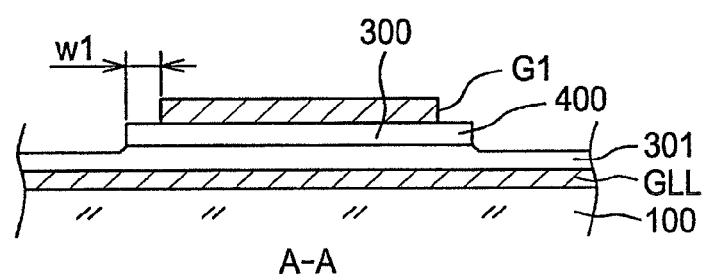
FIG. 4 is a cross-sectional view in the scan line control area according to a second embodiment.

There is also a process in which the interlayer insulating film 300 is slightly etched during etching of the a-Si film 400. FIG. 4 shows an example of this case in FIG. 1. FIG. 4 shows a portion corresponding to the A-A cross section of the area C inside the terminals 200 in FIG. 1. Further, FIG. 5 shows a portion corresponding to the B-B cross section of the area D outside the terminal 200 in FIG. 1.

In FIG. 4, the interlayer insulating film 300 keeps the original film thickness below the a-Si film 400. However, in the portion not covered with the a-Si film 400, namely, in the portion indicated by 301, the thickness of the interlayer insulating film is smaller than the original film thickness. However, in FIG. 4, the width of the a-Si film 400 is greater than the width of the upper line. For this reason, the withstanding voltage between the lower line GLL and the upper line G1 is hardly reduced.

Figure 5:
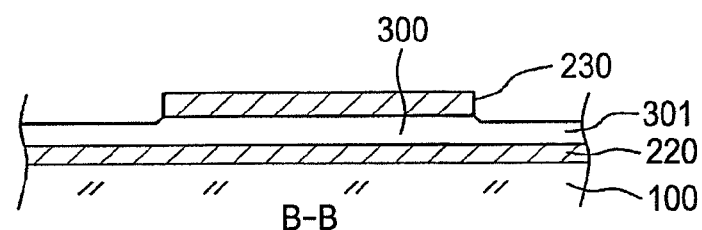
FIG. 5 is a cross-sectional view of the intersection between the static electricity protection line and the earth line according to the second embodiment.

FIG. 5 is a cross-sectional view of the intersection between the earth line 220 and the static electricity protection line 230 outside the terminal 200. In FIG. 5, the interlayer insulating film keeps the original film thickness below the static electricity protection line 230. However, in the portion other than the portion below the static electricity protection line 230, namely, in the portion indicated by 301, the thickness of the interlayer insulating film is smaller than the original film thickness. In FIG. 5, the thickness of the interlayer insulating film 300 is reduced in an end portion of the static electricity protection line 230. Thus, the withstanding voltage is reduced in this portion.

As described above, using the process to slightly reduce the thickness of the interlayer insulating film 300 during the etching of the a-Si film 400, the difference in the withstanding voltage further increases between the area inside the terminal 200 in FIG. 1, namely, the area C, and the area outside the terminal 200 in FIG. 1, namely, the area D.

Thus, according to this embodiment, when static electricity is generated, the protection of the TFT or the interlayer insulating film in the display area 500 and the control area can be further ensured.

The above description assumes that the liquid crystal display device uses the selector driving method, but the present invention is not limited to this example. The present invention may also be applied to a liquid crystal display device having a configuration in which the lower lines such as the scan lines GL, and the upper lines such as the image signal lines DL, intersect each other through the interlayer insulating film 300.

Further, the above description assumes that the a-Si film 400 is formed on the interlayer insulating film 300 and below the upper lines in the display area 500 and in the control area. However, the same effect can be obtained when poly-Si is formed.

What is claimed is:

1. A liquid crystal display device, comprising a substrate on which a display area with a plurality of pixels, a control area adjacent to the display area and a terminal formed in the control area are formed,
   wherein the control area includes:
   a first line extending from the terminal to the substrate edge side,
   a second line extending from the terminal to an opposite side of the substrate edge side and formed in the same layer as the first line, and
   a third line intersecting with the second line in an intersection in a plane view,
   wherein an insulating film, and an a-Si film or a poly-Si film are formed between the second line and the third line in the intersection, and
   wherein the insulating film is formed between the first line and the substrate, and
   the a-Si film and the poly-Si film are not formed between the first line and the substrate.

2. The liquid crystal display device according to claim 1, wherein the third line is closer to the substrate than the second line.

3. The liquid crystal display device according to claim 1, wherein the first line is cut at the edge of the substrate.

4. The liquid crystal display device according to claim 1, wherein a scan signal is applied to the second line, and a signal applied to the third line controls supplying the scan signal of the second line.

5. The liquid crystal display device according to claim 1, wherein a video signal is applied to the third line, and a control signal to control a scan signal line is applied to the second line.

6. The liquid crystal display device according to claim 1, wherein a width of the a-Si film or a width of the poly-Si film is larger than a width of the second line at the intersection.

7. The liquid crystal display device according to claim 1, wherein a thickness of the insulating film at the intersection is larger than the thickness of the insulating film formed between the first line and the substrate.

8. A thin film transistor substrate, comprising a substrate on which a display area with a plurality of pixels, each of the pixels including a thin film transistor, a control area adjacent to the display area and a terminal formed in the control area are formed,
   wherein the control area includes:
   a first line extending from the terminal to the substrate edge side,
   a second line extending from the terminal to an opposite side of the substrate edge side and formed in the same layer as the first line, and
   a third line intersecting with the second line in an intersection in a plane view,
   wherein an insulating film, and an a-Si film or a poly-Si film are formed between the second line and the third line in the intersection, and
   wherein the insulating film is formed between the first line and the substrate, and
   the a-Si film and the poly-Si film are not formed between the first line and the substrate.

9. The thin film transistor substrate according to claim 8, wherein the third line is closer to the substrate than the second line.

10. The thin film transistor substrate according to claim 8, wherein the first line is cut at the edge of the substrate.

11. The thin film transistor substrate according to claim 8, wherein a scan signal is applied to the second line, and a signal applied to the third line controls supplying the scan signal of second line.

12. The thin film transistor substrate according to claim 8, wherein a video signal is applied to the third line, and a control signal to control a scan signal line is applied to the second line.

13. The thin film transistor substrate according to claim 8, wherein a width of the a-Si film or a width of the poly-Si film is larger than a width of the second line at the intersection.

14. The thin film transistor substrate according to claim 8, wherein a thickness of the insulating film at the intersection is larger than the thickness of the insulating film formed between the first line and the substrate.

* * * * *